United States Patent [19]

Seibel

[11] Patent Number: 4,488,002

[45] Date of Patent: Dec. 11, 1984

[54] LINE CONTROL OF SWITCHED NETWORK DATA SETS

[75] Inventor: Richard R. Seibel, Barnegat, N.J.

[73] Assignee: AT&T Bell Laboratories, Murray Hill, N.J.

[21] Appl. No.: 333,038

[22] Filed: Dec. 21, 1981

[51] Int. Cl.³ .......................................... H04M 11/00
[52] U.S. Cl. .................................................. 179/2 DP
[58] Field of Search ................. 179/2 DP, 2 C; 375/7, 375/8; 370/76

[56] References Cited

U.S. PATENT DOCUMENTS

| | | | |
|---|---|---|---|
| 3,113,176 | 12/1963 | Dokter et al. | |
| 3,701,851 | 10/1972 | Starrett | 370/76 X |
| 3,809,818 | 5/1974 | Johnston | 370/76 |
| 3,824,347 | 7/1974 | Sorber et al. | 370/76 |
| 3,875,339 | 4/1975 | Gruen et al. | 179/2 DP X |
| 4,009,342 | 2/1977 | Fahrenschon et al. | 179/2 DP |
| 4,171,467 | 10/1979 | Evenchik | 179/2 DP X |
| 4,306,116 | 12/1981 | McClure et al. | 179/2 DP |
| 4,389,544 | 6/1983 | Wagner et al. | 179/2 DP |
| 4,398,297 | 8/1983 | Hwang et al. | 375/7 |

OTHER PUBLICATIONS

*Bell System Data Communications Technical Reference*, "Data Set 202E Series", American Telephone and Telegraph Company, New York, Mar. 1968.

Primary Examiner—Keith E. George
Attorney, Agent, or Firm—Ronald D. Slusky

[57] ABSTRACT

Each station of a switched telephone network voiceband data communication system includes a data set and a telephone set. The data set includes primary signal processing circuitry which performs the real-time signal processing of the data set under the control of a microprocessor-based primary controller. The latter also controls connection of the data set and telephone set to, and disconnection of same from, the telephone line. A portion of the frequency spectrum of the telephone line is allocated to a secondary channel over which a secondary controller within each data set communicates test, health and other information to a counterpart within the other data set. Line functions, such as the switching of a station into and out of the data state, talk state and disconnect state, are not executed at least until a line control message indicative of the line function in question has been communicated to the data set within the other station via the secondary channel. This allows appropriate steps to be taken at one or both stations to avoid such potential problems as the non-disconnection of unattended telephones and the premature re-enabling of disabled echo suppressors.

16 Claims, 12 Drawing Figures

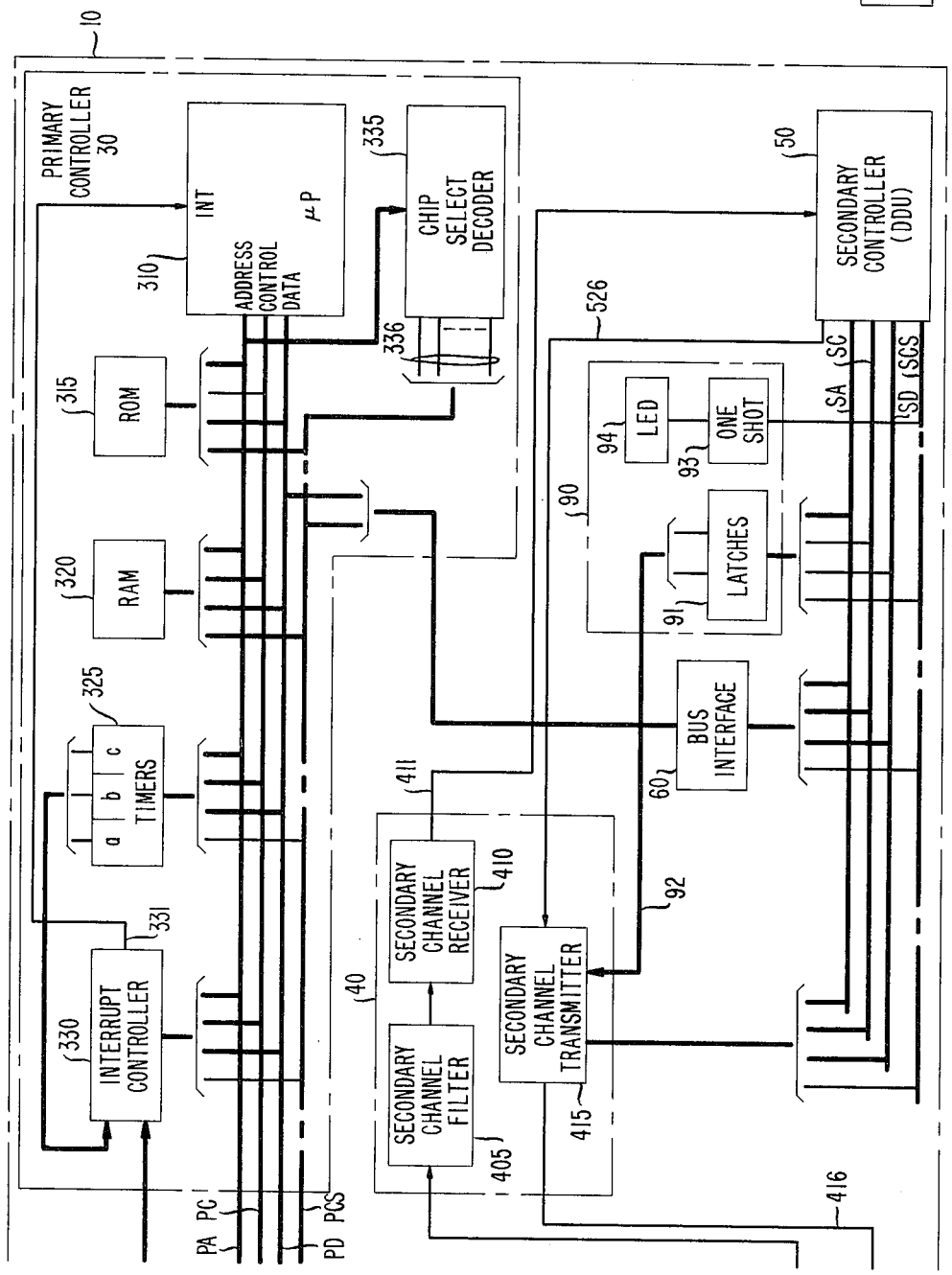

LINE CONTROL OF SWITCHED NETWORK DATA SETS

BACKGROUND OF THE INVENTION

The present invention relates to the transmission of data over switched-network telephone channels.

The communication of data over telephone transmission facilities is conventionally carried out in either of two ways. One involves transmission of the data over a so-called private line in which the connection between transmitting and receiving equipment is always in place. The other involves transmission of the data over a switched-network, or "dial-up," channel.

The considerations relevant to the transmission of data over these two kinds of facilities are the same in many ways. For example, both typically require the use of a data set, or modem, the principal function of which is to modulate user-provided data into the passband of the telephone channel at the transmitting end and to demodulate the received data signals at the receiving end and recover the transmitted data. There are, however, some considerations unique to each. The present invention, in particular, is directed to certain problems which can arise in switched-network data transmission applications.

One of these problems arises as follows: Normally at the end of a call, the data processing equipment at one end of the channel, e.g., the equipment which initiated the call, transmits an end-of-call message to the equipment at the other end once the transfer of data has been completed. This serves as notice to the latter equipment that its associated telephone set should be disconnected from the telephone line. On occasion, however, the far-end equipment (e.g., central office) may never receive the end-of-call message. This can happen if, for example, the near-end telephone set is accidentally disconnected while communication of data is continuing. In that case, the telephone company's central office serving the near-end telephone transmits a disconnect signal to the central office serving the far-end telephone. Most central offices are designed to recognize the disconnect signal and will automatically disconnect the far-end telephone. However, some central offices do not recognize the disconnect signal. This leaves the far-end telephone indefinitely "busy", thereby precluding receipt of any further calls from other equipment unless the far-end telephone is hung up manually.

Another problem which may occur in switched-network data transmission arises as follows: In order for data to be efficiently exchanged over the switched-network at high speed, any echo suppressors in the transmission channel must be disabled. In Bell System facilities, for example, the echo suppressors are disabled in response to a 2025 Hz disabling tone transmitted by the called data set during call set-up. Thereafter the echo suppressors remain disabled as long as energy is maintained on the line. If energy is absent from the line for more than about 100 ms, the echo suppressors will re-enable. In order to ensure that this does not happen, one or both data sets transmits a holding tone whenever it detects a no-energy condition on the line. A problem arises, however, in circuits with long propagation times, e.g., satellite circuits. Suppose that a user transfers a calling station from the data mode to the talk mode by pushing the "talk" button on the telephone set. This action disconnects the signal processing circuitry of the data set from the telephone line and connects the telephone set thereto. With the calling data set disconnected from the line, only the called set can transmit the above-described holding tone. Assume further that the user causes energy to appear on the line by talking into the receiver. Upon detecting this energy, the called data set turns off its holding tone. This causes there to be an energy gap at the calling data set, and thus at its echo suppressor, for a time period which is a lesser of (a) duration of the voice energy and (b) the round trip propagation time of the channel. If that gap is greater than 100 ms, the echo suppressor at the calling set re-enables. Since the typical round trip delay on a satellite circuit is 600 ms, this problem is not uncommon on such circuits. Returning to the data mode will not re-disable the echo suppressors if the calling set was the one that was switched to the talk mode, because only the called data set transmits the disabling tone.

SUMMARY OF THE INVENTION

The above and other problems are avoided in accordance with the present invention by utilizing a so-called secondary channel—such as that often used in private line data set networks to provide data set diagnostics—to communicate line control signals. In the prior art, actions taken by the user or the user's equipment immediately result in the execution of particular line functions at the station in question. For example, the "data" button, "talk" button, or switch hook of the telephone set might be depressed or the so-called terminal-ready lead extending from the user's equipment might be dropped (placed in the low state). In the prior art, such actions would immediately result in the execution of such line functions as connecting the data set to the telephone line and concurrently disconnecting the associated telephone set therefrom, thereby placing the station in the data state; connecting the telephone set to the line and concurrently disconnecting the data set therefrom, thereby placing the station in the talk state; or causing both the data set and telephone set to be disconnected from the line, thereby placing the station in the disconnect state.

In accordance with the invention, however, such line functions are not executed at a station at least until a line control signal indicative of the new line state in which it is desired to establish the station has been communicated to the data set within the other station. This allows appropriate steps to be taken at one or both stations to avoid the above-outlined and other problems.

BRIEF DESCRIPTION OF THE DRAWING

FIGS. 2 and 3, when arranged as shown in FIG. 4, comprise a block diagram of a voiceband data set and telephone set used in the system of FIG. 1;

FIG. 12 shows various files within a read-only-memory in the primary controller.

DETAILED DESCRIPTION

Figure 1:
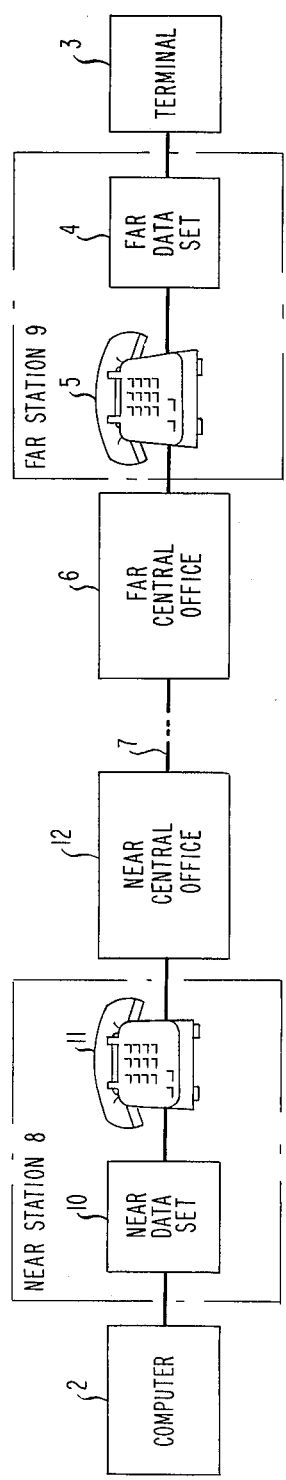
FIG. 1 is a block diagram of a communications system in which the present invention is used.

In the communications system of FIG. 1, a computer 2 communicates with a terminal 3 via a near data communication station 8, local central office 12, two-wire switched network telephone line 7, far central office 6, and far data communication station 9. Near station 8 comprises near data set 10 and near telephone set 11. Far station 9 comprises far data set 4 and far telephone set 5.

Figure 6:
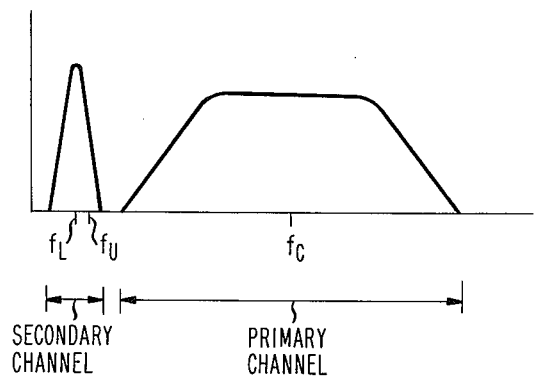
FIG. 6 shows the division of the bandwidth over which the data set operates into primary and secondary channels.

The bandwidth of line 7 is divided into primary and secondary channels, as shown in FIG. 6. The primary channel carries modulated data, start-up signals and various test signals. The secondary channel carries diagnostic and control information between data sets 4 and 10. As described in detail hereinbelow, the present invention principally involves communications over the secondary channel.

Figure 2:
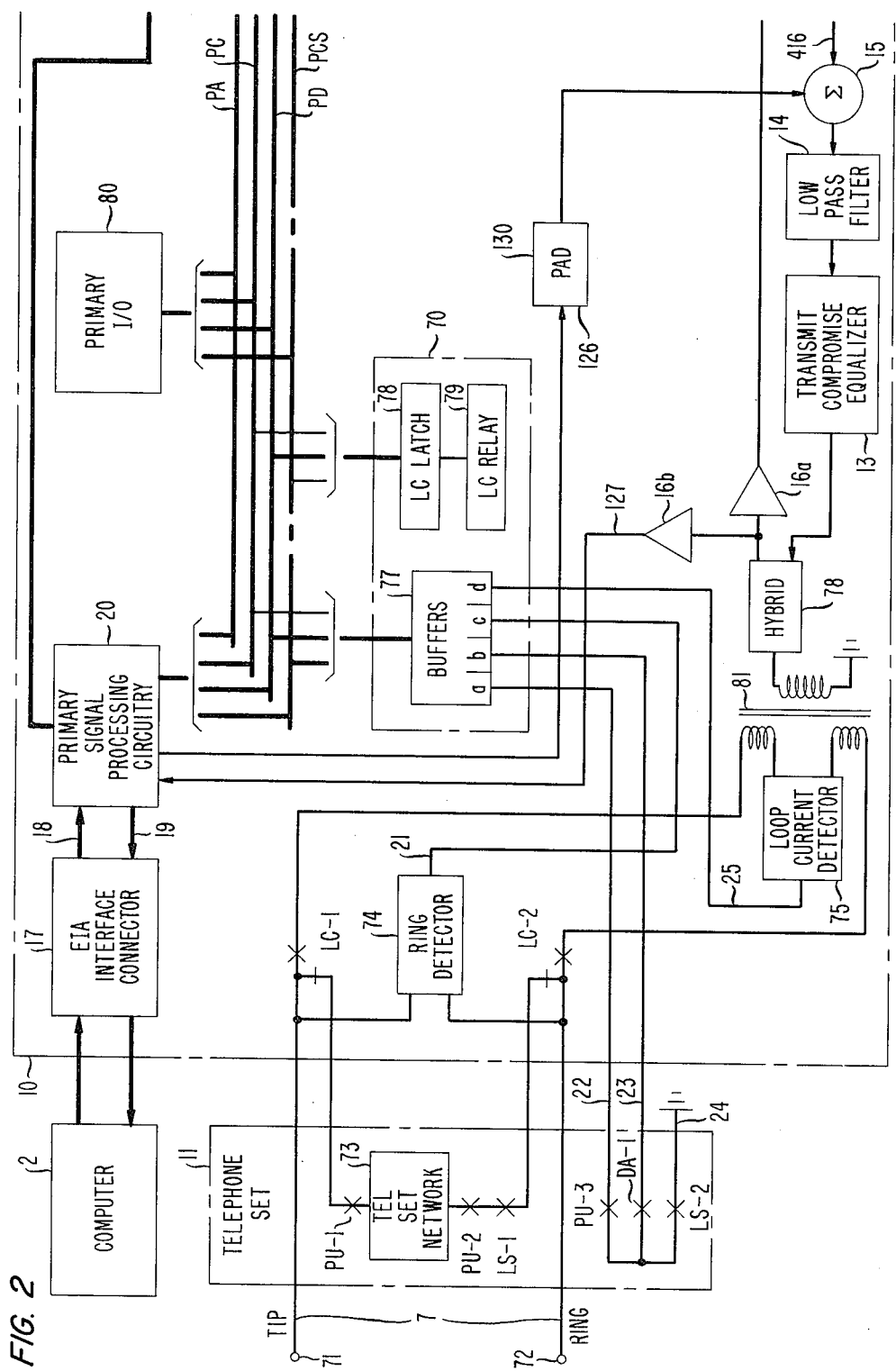
Figure 5:
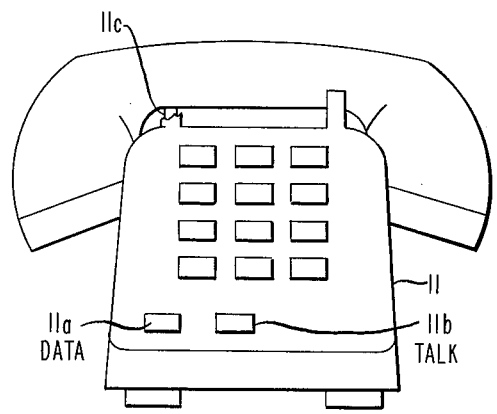
FIG. 5 depicts one of the telephone sets used in the communications system of FIG. 1.

Data sets 4 and 10 are illustratively similar in design, and virtually everything said herein with respect to the latter is equally applicable to the former. By way of example, FIGS. 2 and 3, when arranged as shown in FIG. 4, depict data set 10 and telephone set 11. The diagram of data set 10 in FIGS. 2 and 3 is, in large measure, a simplified version of the drawing in FIGS. 2-5 of the commonly-assigned U.S. patent application of J. H. Hwang et al., Ser. No. 196,157, filed Oct. 10, 1980, now U.S. Pat. No. 4,398,297, hereby incorporated by reference. If desired, reference may be made to that application for a more detailed exposition of various elements of the data set.

DATA SET CIRCUITRY

Primary Circuitry

Data set 10 includes primary and secondary circuitries which are associated with communications over the primary and secondary channels, respectively. The primary circuitry will be described first.

The primary circuitry is comprised of primary signal processing circuitry 20, primary controller 30, line control circuitry 70, and primary input/output (I/O) circuitry 80. Circuitry 20 performs the real-time processing of user-provided data and received data signals. It interfaces with computer 2 via EIA interface connector 17, with signals incoming from (outgoing to) the connector being carried on various loads within cable 18 (19). For example, serial data from computer 2 is provided from connector 17 via the so-called "send data" lead within cable 18. The signal data from computer 2 is scrambled, encoded, formatted and modulated. The modulated transmit data signal is transmitted over the primary channel of line 7 via lead 126, pad 130, combiner 15, lowpass filter 14, transmit compromise equalizer 13, hybrid 78, transformer 81, the make contacts of transfer pairs LC-1 and LC-2 and tip and ring terminals 71 and 72. Circuitry 20 also receives modulated data signals from the primary channel of line 7 via tip and ring terminals 71 and 72, the make contacts of transfer pairs LC-1 and LC-2, transformer 81, hybrid 78, preamplifier 166 and lead 127. Circuitry 20 recovers a far-end data stream from the received signal and presents it to computer 2 via an appropriate lead in cable 19.

Line control circuitry 70 includes line control buffers 77, LC latch 78 and LC relay 79. The function of this circuitry can be understood by first referring to FIG. 5, which depicts the housing and control buttons of telephone set 11. Of particular relevance are "data" button 11a, "talk" button 11b, and switch hook 11c. When the user lifts the handset off the cradle of the telephone set, switch hook 11c switches from its depressed, or on-hook, position it its undepressed, or off-hook, position, causing contact LS-2 (shown in FIG. 2) to close. If, in addition, the "talk" button is operated, by being depressed, "pick-up" contact PU-3 is closed. Thus, ground potential is extended to one of line control buffers 77—buffer 77a—via lead 24, closed contacts LS-2 and PU-e, and lead 22. The state of buffer 77a—as well as the respective states of buffers 77b-77d—is periodically monitored in the hereinafter—discussed data set background loop, thereby providing an indication to controller 30 that telephone set 11 is off hook and has the "talk" button depressed.

If, alternatively, "data" button 11a is operated, by being depressed, contact DA-1 is closed and contact PU-3 is open. This indicates to controller 30 that telephone set 11 is off hook with its "data" button operated because ground potential is then extended to buffer 77b via lead 24, closed contacts LS-2 and DA-1 and lead 23.

A ring detector 74 connected across tip and ring provides an indication to controller 30 via lead 21 and buffer 77c whenever ringing voltage is present, enabling data set 10 to have an automatic answering capability. A loop current detector 75 connected across tip and ring beyond contacts LC-1 and LC-2 provides an indication to controller 30 via lead 25 and buffer 77d when loop current is present, enabling data set 10 to have an automatic hang-up capability.

LC relay 79 is operated by controller 30 via LC latch 78. When relay 79 is operated, near station 8 is established in a first line state in which the data communication circuitry of data set 10 is connected to line 7. When relay 79 is released and, in addition, switch hook 11c is in its off-hook position and "talk" button 11b is depressed, near station 8 is established in a second line state in which telephone set 11 is connected to line 7 via the connection to line 7 of telephone set network 73, the latter comprising the electronics of the telephone set. Near station 8 can also be established in at least a third line state which neither telephone set 11 nor the data communication circuitry of data set 10 is connected to line 7. These three line states are hereinafter referred to as the data, talk and disconnect states, respectively.

Primary I/O circuitry 80 illustratively includes a set of latches which control various light-emitting diode indicators on the data set front panel (not shown). These indicators indicate to the user such items as whether the data set is operating properly or not or whether it is in a normal or test state. Other latches within circuitry 80 control an alphanumeric display via which various messages, test name mnemonics and test results are presented to the user. Circuitry 80 also includes a set of buffers via which the positions of various front panel switches are read. These are operated by the user to issue various commands to the data set.

Primary signal processing circuitry 20 and primary I/O circuitry 80 are both controlled by primary controller 30. The latter includes a microprocessor 310 and associated peripherals including read only memory (ROM) 315, random access memory (RAM) 320, timer circuitry 325, interrupt controller 330 and chip select decoder 335. Controller 30 communicates with its peripherals and the rest of the data set by writing information into, and reading information out of, registers, buffers and/or latches throughout the data set. This communication is carried out via three buses—primary address bus PA, primary control bus PC, primary data bus PD—and a primary chip select cable PCS.

The leads 336 of cable PCS are derived by chip select decoder 335 from a subset of the address bus leads. The leads of cable PCS extend to various integrated circuit chips or groups of chips (e.g., ROM 315) within the data set. When it is desired to communicate with a particular device, i.e., register, buffer or latch, microprocessor 310 provides on bus PA an address unique thereto. Decoder 335 provides a signal on an appropriate one of leads 336 indicating that the controller wishes to communicate with the device in question. If more than one device is associated with a particular chip select lead, the particular circuit desired to be communicated with is identified by an address on bus PA.

Data bus PD is a bidirectional 8-bit bus over which the information itself is carried. Control bus is a two-bit bus having a read lead and a write lead. Activation of the write lead means that information provided on bus PD is to be written in a register or latch which has been addressed. Activation of the read lead means that information is to be provided on bus PD by the register or buffer which has been addressed.

Not all leads of all buses extend to each circuit with which controller 30 communicates. For example, latches (buffers) receive only the write (read) lead of the control bus. In addition, the various integrated circuits comprising the data set may receive less than the full number of address leads, depending on the number of addressable elements contained therein.

Some of the functional blocks shown in FIGS. 2-3, e.g., bus interface 60, receive more than one chip select lead, as indicated by a cable, rather than a lead, tap off of chip select cable PSC. Buffers used to drive the three buses and cable PSC are not shown in the drawing.

Figure 7:
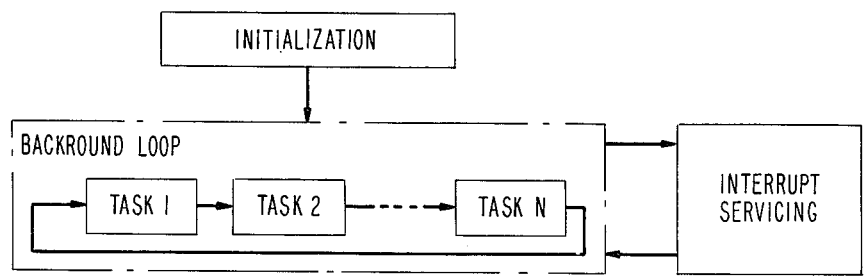
FIG. 7 is a flowchart of the overall operation of a primary controller within the data set of FIGS. 2-3.

The overall operation of controller 30 is depicted in FIG. 7. Firstly, controller 30 initializes itself and the rest of the data set. For example, it places LC relay 79 in the released state so that near station 8 will be established in the talk state when the handset of telephone 11 is initially picked up and "talk" button 11b is operated. Controller 30 then enters a background loop in which it repetitively performs a number of predetermined background "tasks" related to the management and monitoring of off-line data set operations and the monitoring of both off-line and real-time operations. Operations of the controller which relate to the control of the real-time signal processing (as well as some other operations) are handled on an interrupt basis. Interrupts are generated, for example, in response to various signal events within circuitry 20. As a particular example, an interrupt is generated when computer 2 raises the so-called request-to-send lead in cable 18. Interrupt controller 330 responds to each interrupt by applying an interrupt signal to microprocessor 310 via lead 331. In response, the microprocessor suspends its execution of the background loop, interrogates interrupt controller 330 to determine the source of the interrupt, and transfers control to an appropriate interrupt service routine within ROM 315.

The interrupt service routine causes controller 30 to write into respective registers of circuitry 20 various operating mode, operating parameter and/or signal format information signals values appropriate to the type of interrupt generated. For example, in the case of an interrupt generated by a raising of the request-to-send lead, controller 30 performs operations such as configuring an encoder within circuitry 20 for start-up, turning on the modulator within circuitry 20, loading (jamming) ideal reference (start-up) data into the encoder, configuring the encoder for normal operation, and raising the so-called clear-to-send lead within cable 19.

Interrupts are also generated on leads 326 by respective ones of three timers 325a, 325b and 325c within timer circuitry 325. Timers 325a and 325b are used principally in connection with transmitter and receiver operations, respectively. Timer 325c is a general purpose timer.

Once an interrupt service routine (or any phase) thereof which is separated from the following phase by a significant time interval) is completed, controller 30 returns to the background loop at the place where it left.

Secondary Circuitry

The secondary circuitry of data set 10 includes secondary signal processing circuitry 40, which is controlled by a controller referred to as Data set Diagnostic Unit (DDU) 50. Circuitry 40 receives diagnostic and control information from DDU 50 and converts it into a 110 baud FSK signal having upper and lower frequencies $f_U$ and $f_L$. This signal is transmitted over the secondary channel of line 7, as described below. In addition, circuitry 40 receives FSK signals from the secondary channel of line 7 and presents a waveform representing the zero crossings of the received signal to DDU 50, which recovers the transmitted intelligence. DDU 50 communicates with controller 30 via bus interface 60—a commercially available device known as a parallel peripheral interface. It also controls secondary I/O circuitry 90.

The internal structure of DDU 50 is not shown, it being similar to the structure of controller 30. DDU 50 communicates with its peripherals and the rest of the secondary circuitry—secondary signal processing circuitry 40 and secondary I/O circuitry 90—via secondary address bus SA, control bus SC, data bus SD and chip select cable SCS.

Secondary signal processing circuitry 40 receives the incoming signal from line 7 via hybrid 78 and preamplifier 16a. Within circuitry 40, the preamplifier output signal is received by secondary channel filter 405 which removes the primary channel receive signal and passes the FSK secondary channel receive signal to receiver 410. The latter provides an output pulse on lead 411 in response to each zero crossing of the FSK signal. Lead 411 extends to DDU 50 which recovers the secondary channel intelligence from the zero crossing information thereon.

Information to be transmitted over the secondary channel is supplied by DDU 50 to secondary channel transmitter 415 within circuitry 40. Transmitter 415 generates an FSK signal representing that information and passes it to combiner 15 via lead 416. Signals from which the frequencies of the two FSK tones are derived are provided to transmitter 415 from a timer within DDU 50 via lead 526.

Secondary I/O circuit 90 includes a pair of latches 91, one-shot 93 and LED 94. The outputs of latches 91 extend to transmitter 415 over cable 92. One of these latch outputs turns transmitter 415 on and off. The other latch output determines which of two predetermined amplitudes the tone currently being transmitted by transmitter 415 is to have; illustratively the higher frequency tone has a smaller amplitude than the lower frequency tone. One-shot 93 is pulsed periodically (e.g., at 1 Hz) by DDU 50 whenever a message has been successfully transmitted or received on the secondary channel. This causes a blinking of LED 94 on the front panel of the data set.

Figure 8:
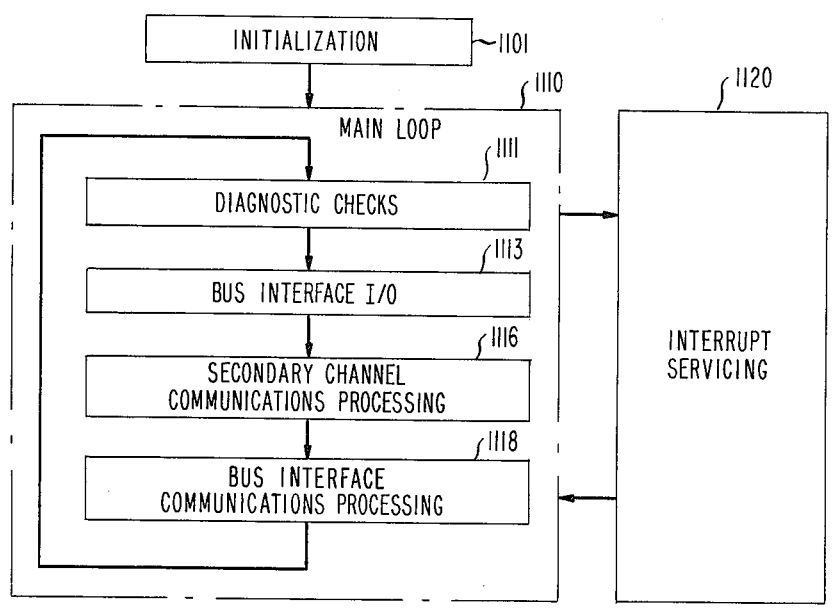
FIG. 8 is a flowchart of the overall operation of a secondary controller within the data set of FIGS. 2-3.

The overall operation of DDU 50 is depicted in FIG. 8. Firstly, as indicated at 1101, DDU 50 initializes itself and the rest of the secondary channel circuitry, similar to the initialization performed by controller 30. When initialization is complete, DDU 50 enters a main loop 1110 comprised of diagnostic checks 1111, bus interface I/O (input/output) 1113, secondary channel communications processing 1116 and bus interface communications processing 1118. Execution of the main loop is suspended to service various types of interrupts, indicated at 1120.

Diagnostic checks 1111 within main loop 1110 include a number of checks on the integrity of the DDU hardware. Information relating to the failure of any of these checks is periodically requested by controller 30.

Bus interface I/O 1113 is the process by which information is read from and written into interface 60. This process, in brief, involves the storing of characters in, and the reading of characters from, the interface in conjunction with the setting and resetting of so-called transmit and receive flags which indicate the status of the interface.

Secondary channel communications processing 1116 relates to (a) the processing of transmissions from far data set 4 once they have been received from the secondary channel and (b) the generation of transmissions intended to be transmitted to far data set 4 over the secondary channel. Similarly, bus interface communications processing 1118 relates to (a) the processing of transmissions received from controller 30 via interface 60 and (b) the generation of transmissions to be sent to that controller via interface 60.

I/O for secondary channel communications is handled on an interrupt basis and is thus not part of main loop 1110. In particular, each of the above-mentioned pulses on lead 411 invokes an interrupt service routine which, by timing the intervals between successive crossings, recovers the "1"s and "0"s represented by the incoming FSK signal. In addition, an interrupt service routine invoked every 9 ms by a timer within DDU 50 determines whether any communication intended for far data set 4 is then stored in an associated transmit buffer within the DDU. If so, the routine determines whether a previous character of the communication is still in the process of being transmitted. If so, return is made to the main loop. If not, transmission of the next character is initiated.

Secondary Channel Communications

Communications over the secondary channel are of several different types. One type of secondary channel communication is a so-called test. For example, a first one of the data sets may request that the other perform a test on itself such as a digital loopback test, and report the results back to first data set, with the results of the test being displayed on the front panel of the first data set for observation by the user. Or, the first data set may request that the other cooperate with it in performing a test on the channel that interconnects them.

Another type of secondary channel communication is a so-called health message in which one data set reports to the other that it has detected a fault in, for example, its circuitry or in some state of its operation. The health of both data sets, if other than OK, is displayed on the front panel of each data set.

In accordance with the invention, the secondary channel is also used for communication of line control signals, as will now be explained.

In the prior art, actions taken by the user or the user's equipment immediately result in the execution of particular line functions. For example, "data" button 11a, talk button 11b, or switch hook 11c of near telephone set 11 might be depressed or the so-called terminal-ready lead within cable 18 might be dropped. In the prior art, such actions would immediately result in the execution of such line functions as connecting near data set 10 to line 7 and concurrently disconnecting near telephone set 11 therefrom, thereby placing near station 8 in the data state; connecting near telephone set 11 to line 7 and concurrently disconnecting near data set 10 therefrom, thereby placing near station 8 in the talk state; or causing both the data set and telephone set to be disconnected from the line, thereby placing near station 8 in the disconnect state.

In accordance with the invention, however, such line functions are not executed at, for example, near station 8 at least until a line control signal indicative of the new line state in which it is desired to establish near station 8 has been communicated to far data set 4 on the secondary channel. This allows appropriate steps to be taken at one or both stations to avoid the above-outlined and other problems.

For example, far data set 4 can take steps to disconnect far station 9 from the line upon receiving, on the secondary channel, a line control signal from near data set 10 indicating that it is desired to switch near station 8 to the disconnect state. (Near station 8 may, for example, have previously been in the data state). This will avoid the possibility that far telephone set 5 will be maintained indefinitely "busy," as described above. Moreover, far data set 4 can be configured to place an unconditional holding tone on the line (i.e., a tone placed on the line without regard to the presence or absence of any other energy thereon), upon receiving a line control signal on the secondary channel from near data set 10 indicating that it is desired to switch near station 8 into the talk state. This will eliminate the above-described echo suppressor re-enabling problem.

In some embodiments of the invention it may be desired to have near data set 10, for example, execute the desired line function concurrent with, or a predetermined time after, the appropriate line control signal has been transmitted to far data set 4. In preferred embodiments, however, the line function is not executed at near data set 10 at least until a confirmatory line control signal has been received on the secondary channel from far data set 4 indicative that the latter received the line control signal transmitted to it by near data set 10. If no confirmatory line control signal is received, near data set 10 can initiate a retransmission of the original line control signal.

Moreover, even after (a) "talk" button 11b has been depressed, (b) an appropriate line control signal has been transmitted to far data set 4 and (c) a confirmatory line control signal has been received from far data set 4, it may be desired to refrain from switching near station 8 from the data state to the talk state until a line control signal is received from far data set 4, (or unless one has already been received from far data set 4) indicating that it is desired to establish far station 9 in the talk state and a confirmatory line control signal is (or has already been) returned to far data set 4. In such an arrangement, the unconditional holding tone is not needed to eliminate the echo suppressor re-enabling problem because talker energy, which causes that problem, cannot appear on the line unless both telephones are in the talk state. Then, of course, the echo suppressors will re-enable, but when the called station is thereafter returned to the data state, the 2025 Hz echo suppressor disabling tone will be repeated.

A further advantage of allowing near station 8 to switch into the talk state only if far station 9 is to be switched into the talk state is that, in the meantime, communication can continue over secondary channel to handle, for example, the subsequent hanging up of either telephone set, as described below.

Figure 9:
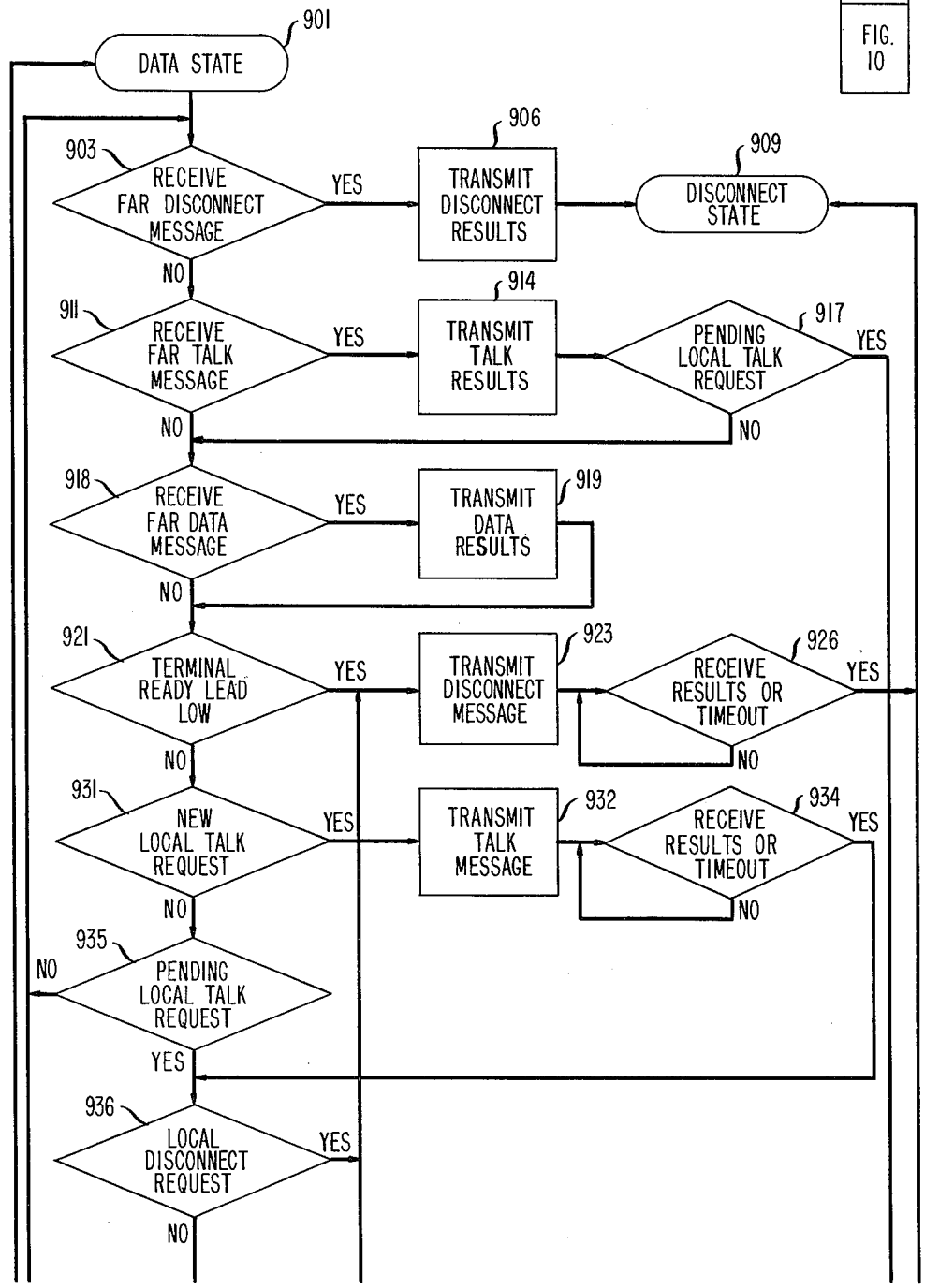
FIGS. 9 and 10, when arranged as shown in FIG. 11, comprise a flowchart depicting the steps of an illustrative process embodying the invention.
Figure 10:
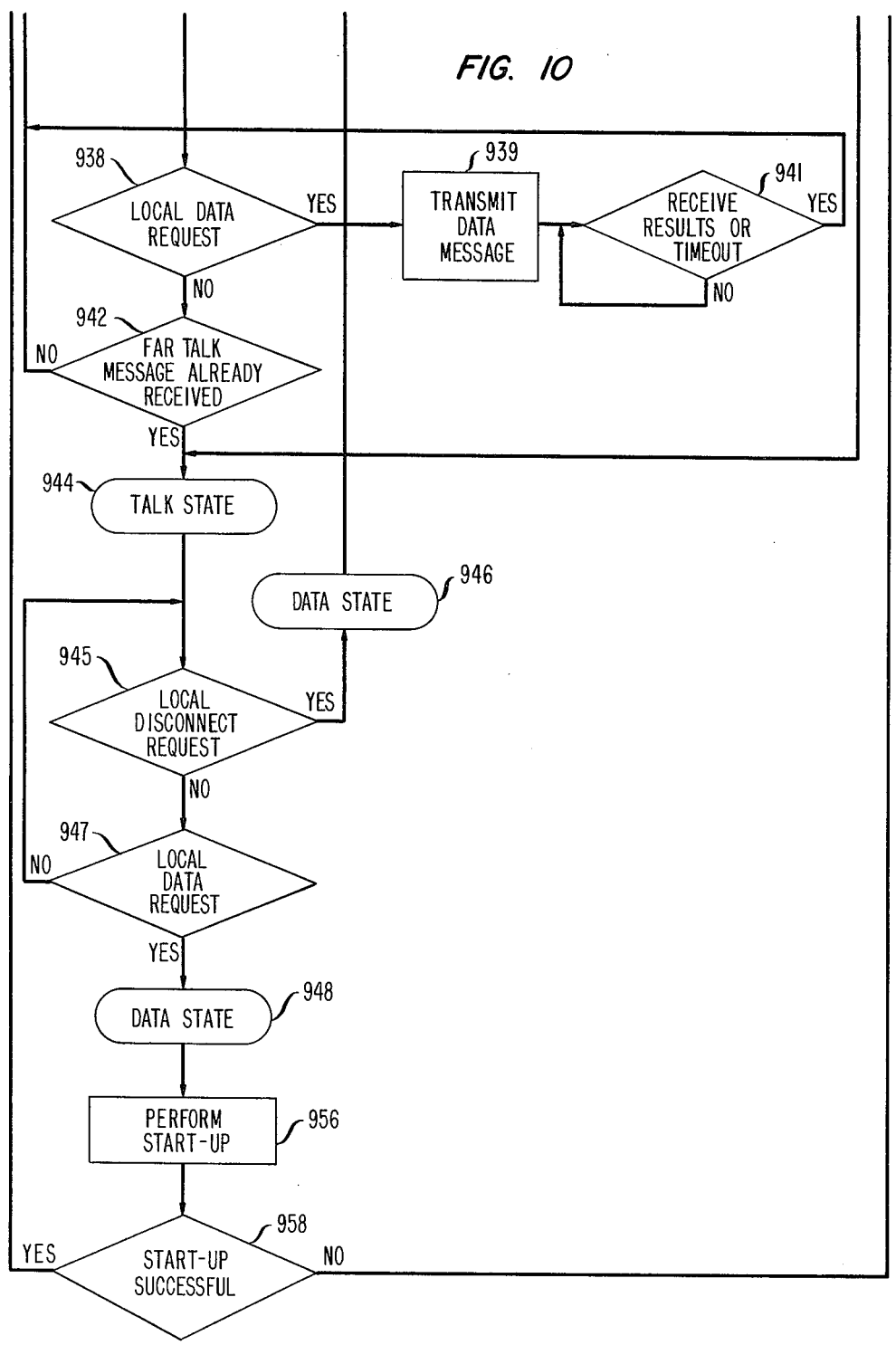

The steps of an illustrative process for carrying out the invention is shown in the flowchart of FIGS. 9 and 10 when arranged as shown in FIG. 11. The steps of the flowchart are described hereinbelow in the context of operations within near data set 10. The flowchart is equally applicable, however, to far data set 4. In addition, it should be understood that the flowchart is presented as a pedagogic aid and should be understood to depict only in a general way (a) how line control information is illustratively communicated over the secondary channel and (b) what actions are illustratively taken by near data set 10 in executing the various line functions. It should thus be understood that the flowchart is not necessarily indicative of the structure or the order of operations within the program routines executed within data set 10. Those skilled in the art will, however, be able to readily devise appropriate such routines.

Assume, as indicated at 901 in FIG. 9, that near station 8 is initially in the data state, i.e., near data set 10 is connected to the line. Assume, further, as indicated at 903, that near data set 10 receives a line control signal from far data set 4 indicating that far station 9 is to be disconnected from the line. Such a line control signal will be transmitted by far data set 4 if, for example, the "terminal ready" lead in the cable connecting terminal 3 to far data set 4 goes low (is dropped) or if the switch hook of far telephone set 5 is depressed while far station 9 is in the talk state.

The above-assumed line control signal from far data set 4 illustratively takes the form of a disconnect message which is generated by the primary controller of far data set 4 and is transmitted to primary controller 30 via the bus interface and DDU of far data set 4, the secondary channel of line 7, DDU 50 and bus interface 60. (The formats of the various line control signals used in the present illustrative embodiment, including the above-described disconnect message, as well as the talk, data, disconnect and results messages described below, are discussed hereinafter under the heading "Secondary Channel Protocol.")

Near data set 10 responds to the disconnect message by transmitting a line control signal in the form of a disconnect "results" message, as indicated at 906. This results message serves as a confirmation to far data set 4 that the disconnect message from far data set 4 was received and correctly interpreted by primary controller 30 of near data set 10. (The term "results" is used because controller 30 illustratively processes the disconnect and other line control messages to be described in the same way as it processes a "test" message and it processes and generates its response in much the same way as it processes and generates test results). Only when the far data set 4 receives the disconnect "results" from near data set 10 will it actually disconnect far station 9 from the line. With far station 9 disconnected, there is no reason for near station 8 to remain in the data state. At this point, then, controller 30 places near station 8 in the disconnect state, as indicated at 909.

Instead of receiving a disconnect message, near data set 10 may receive from far data set 4 a far talk message, as indicated at 911. This message indicates that far station 9 has been in the data state but that the "talk" button of far telephone set 5 has now been depressed. Near data set 10 responds to the far talk message by transmitting talk "results", as indicated at 914. As before, the talk results serve as confirmation to far data set 4 that the latter's message was received and interpreted correctly by primary controller 30.

In the present illustrative embodiment, near data set 10 will not switch near station 8 to the talk state unless it has received a far talk message from far data set 4. Thus, even though near station 8 is now in the data state, it is possible, as discussed below, that a local talk request is pending, i.e., talk button 11b has already been depressed, and that a talk message has already been depressed, and that a talk message has already been transmitted to, and a talk results message received from, far data set 4. If such is the case, as indicated at 917, near data set 10 now switches near station 8 into the talk state, as indicated at 944.

If no local talk request is pending, a determination is made at 918 as to whether near data set 10 has received a far data message from far data set 4. Such a message will generally be received only if far data set 4 has previously transmitted a far talk message in response to the operation of the talk button of far telephone set 5 but before a local talk request occurs at near station 8, the "data" button of far telephone set 5 is operated. This serves as an indication to near data set 10 that a previously-pending talk request at far station 9 has terminated. As indicated at 919, near data set 10 transmits data results to far data set 4 in response to the far data message.

If none of the messages described above have been received, or there is no pending local talk request, a determination is made, as indicated at 921, as to the state of the terminal ready lead within cable 18. The signal on the terminal ready lead is a control signal the value of which, as its name implies, indicates the readiness of the terminal 3 to send and receive data. In particular, a high state on the terminal ready lead indicates such readiness, and serves as an indication to primary controller 30 that data set 10 can be connected to the line. Once connection of the data set 10 to the line has been effected, switching of the terminal ready signal to the low state serves as an indication to primary controller 30 that data set 10 is to be disconnected from the line without reconnection of telephone set 11 thereto so that near station 8 is placed in the disconnect state. Before this can happen, however, a disconnect message must be transmitted to, and disconnect results received from, far data set 4, as indicated at 923 and 926, respectively. Near data set 10 then switches near station 8 to the disconnect state, as indicated at 909. If no disconnect results are received, as may result, for example, from equipment or channel failure, near station 8 is placed in the disconnect state after a predetermined timeout interval, as also indicated at 926.

Another possibility, as indicated at 931, is that a local talk request is generated via the operation of "talk" button 11b. Near data set 10 responds by transmitting a talk message, as indicated at 932. Once, as indicated at 934, talk results have been received from far data set 4 or the timeout period has elapsed, a determination is made, as indicated at 936, as to whether a local disconnect request has been made via the depressing of switch hook 11c. This determination is also make if, as indicated at 935, a local talk request is pending. If a local disconnect request as been made, the same procedure as described above in connection with a low terminal ready lead is carried out, resulting, ultimately, in the diconnection of near station 8 from the line.

Instead of switch hook 11c being depressed, "data" button 11a may be operated. At this time, near data set 10 is still in the data state. Thus all that needs to be done in response to the operation of "data" button 11a is to transmit a data message to far data set 4, as indicated at 939, thereby indicating to far data set 4 that the new or previously pending local talk request has terminated, and thereby, in effect, negating the most recent talk message transmitted to far data set 4. Once, as indicated at 941, near data set 10 receives data results or the timeout period elapses, return is made to 903.

If neither a local disconnect request or local data request have occurred, a determination is made, as indicated at 942, as to whether a far talk message (not followed by a far data message) has already been received. Since "talk" button 11b of near telephone set 11 is depressed at this time, a positive determination in 942 causes near data set 10 to switch near station 8 to the talk state, as indicated at 944. A negative determination at 942 causes a return to 903.

Once near station 8 is in the talk state, there are two possibilities. As indicated at 945, one possibility is the occurrence of a local disconnect request generated by the depressing of switch hook 11c. In this eventuality, near data set 10 thereupon returns near station 8 to the data state, as indicated at 946, so that the disconnect message indicated at 923 can be transmitted. And, as before, near station 8 is placed in the disconnect state once disconnect results have been received from far data set 4 or the timeout interval has elapsed.

The other possibility is that "data" button 11a will be depressed. This action is interpreted by near data set 10 as a local data request, as indicated at 947. In response, near data set 10 returns near station 8 to the data state, as indicated at 948, and as indicated at 956, performs (in conjunction with far data set 4) a data state start-up which is substantially identical to the one that was executed when "data" button 11a was first operated. If the start-up is completed successfully, as indicated at 958, near data set 10 returns to the data state. If, because of channel or equipment problems, for example, a start-up cannot be successfully completed, near station 8 is placed in the disconnect state.

Secondary Channel Protocol

The message formats and protocols for communications between the primary controller of each data set and its respective DDU are illustratively similar to those described in the above-cited Hwang patent application and will not be described further herein. However, the message formats and protocols for communications between the two DDUs over the secondary channel are illustratively somewhat different from those disclosed in the Hwang patent application and will now be described.

When neither data set has a test, health, line control or other message to be communicated to the other, communications over the secondary channel comprise alternate exchanges of the ASCII end-of-text character EOT. The receipt of an EOT by a first one of the data sets serves as an indication to that data set that the health of the second data set is OK and that the first data set is free to transmit. If, as assumed, the first data set also has no message to transmit, it responds with another EOT, and so forth.

Once, for example, primary controller 30 of near data set 10 communicates a test, health or line control message to DDU 50 for transmission to far data set 4, the message is held stored in DDU 50 until the DDU is free to transmit it, i.e., until an EOT is received from the DDU of far data set 4. The message is then transmitted. It is illustratively of the form $$S \qquad E\,b$$
$$T t_1 t_2 \ldots t_j T\,c,$$
$$X \qquad X\,c$$

where STX is the ACSII start-of-text character, $t_1, t_2 \ldots t_j$ are one or more ASCII characters comprising the text of the message, and ETX is the ASCII end-of-text character. The ETX is followed by a longitudinal block check character, represented above by a "bcc." The block check character is a function of the previous characters and is used to detect if there were transmission errors.

If the message is received incorrectly, i.e., its format or block check character are incorrect, the DDU of far data set 4 responds with the ASCII negative acknowledgment character, NAK. DDU 50 will then retransmit the message unless this NAK is the third one that it received. Once the message is received correctly, the DDU of far data set 4 responds with the ASCII positive acknowledgment character, ACK. DDU 50 then transmits an EOT.

At this point, transmission of the message is complete. The DDU of far data set 4 thereupon passes the text of the message to its associated primary controller, which then acts upon the text. The EOT just received by far data set 4 from near data set 10 is interpreted by the former as a request for "results." Typically, it will not be possible for "final" results, such as the results of a test or a confirmation of a line control message, to be immediately returned to near data set 10 because of the time required to complete a test and/or because of the delay attendant to communication between the primary controller and DDU of far data set 4. Accordingly, far data set 4 returns "pseudo-results" to near data set 10, such as a "communications in progress" message. Near data set 10 responds with an ACK, assuming that it received the message correctly and far data set 4 responds with an EOT.

Presumably, near data set 10 has no further messages to transmit and so it transmits an EOT. This is again interpreted by far data set 4 as a request for results since only pseudo-results were transmitted the last time. The process continues until final results are returned to near data set 10.

FIG. 12 depicts various program files within ROM 315 of primary controller 30. In particular:

EIA task 1201 is a task within the above-described background loop (FIG. 7) which monitors the states of the leads in cable 18, including, for example, the terminal ready lead.

Line state request monitoring task 1202 is another background task which monitors the positions of "data" button 11a, "talk" button 11b and switch hook 11c via buffers 77a–c. (Buffers 77a–c could, alternatively, be read in response to interrupts generated at regular intervals by one of the timers within primary controller 30.)

DDU handler task 1204 is another background task which writes characters into, and reads characters from, bus interface 60.

ROM 315 includes various other background tasks, as indicated at 1207. These include, for example, one or more tasks which oversee the running of tests and execution of the start-up protocols.

Tests 1211 contain the program instructions which embody the tests and start-up protocols themselves.

Task handler 1214 is a routine which carries out the background loop by causing controller 30 to sequentially perform the above-described and other background tasks.

Interrupt handler 1218 is a routine whose principal job is to interrogate interrupt controller 330 to determine the source of each interrupt received by microprocessor 310 on lead 331 and to then transfer control to an appropriate one of interrupt service routines 1221.

Initialization routines 1224 are the routines which control the data set when power is first applied thereto, thereby performing the initialization function indicated in FIG. 7.

Line control routines 1228 are the routines within ROM 315 which carry out the steps of the flowchart of FIGS. 9 and 10.

ROM 315 includes other files, indicated at 1231, such as various data files and utility routines.

The foregoing merely illustrates the principles of the present invention. Thus, for example, the invention can be used to communicate any type of line control information over the secondary channel. Moreover, although the invention is described herein as being useful for overcoming specific problems that may be encountered in switched network data sets, such as the above-described non-disconnect problem and the echo suppressor re-enabling problem, its use is not limited to applications in which these specific problems may occur. Rather, the use of the secondary channel to communicate line control information may be found advantageous in overcoming other problems which may be desired to be dealt with.

In addition, it should be appreciated that the invention can be used in conjunction with any secondary channel signalling format or protocol, including, for example, the use of signalling tones, and can be used in applications in which the secondary channel does not comprise a dedicated portion of the frequency spectrum of the channel but, rather, is realized in other ways, e.g., using some form of time division multiplexing.

It will thus be appreciated that those skilled in the art will be able to devise numerous arrangements which, although not specifically shown or described herein, embody the principles of the invention and thus do not depart from its spirit and scope.

What is claimed is:

1. A data set adapted for use in conjunction with a telephone set which has a talk button and a data button, said data set comprising data communication means for transmitting voiceband data signals to, and receiving voiceband data signals from, a second data set over a voiceband telephone line, means operative when said talk button is operated for connecting said telephone set to said line and for thereafter connecting said data communications means to said line in response to operation of said data button, said line control means operative when said data communications means is connected to said line and said talk button is thereafter operated for transmitting to said second data set over said line a line control signal indicative of the operation of said talk button and for reconnecting said telephone set to said line no sooner than at a time subsequent to the transmission of said line control signal.

2. A data set adapted for use in conjunction with a telephone set which has a talk button and a data button, said data set comprising data communication means for transmitting voiceband data signals to, and receiving voiceband data signals from, a second data set over a voiceband telephone line, means operative when said talk button is operated for connecting said telephone set to said line and for thereafter connecting said data communication means to said line in response to operation to said data button, and line control means operative when said data communication means is connected to said line and said talk button is thereafter operated for transmitting to said second data set over said line a first line control signal indicative of the operation of said talk button and for reconnecting said telephone set to said line no sooner than at a time subsequent to receipt from said second data set over said line of a second line control signal indicative to said data set that said first line control signal was received by said second data set.

3. A data set adapted for use in conjunction with a telephone set, said data set comprising data communication means for transmitting voiceband data signals to, and receiving voiceband data signals from, a second data set over a voiceband telephone line, means operative when the switch hook of said telephone set is in a first position for connecting a selected one of said data communication means and said telephone set to said line, and line control means operative when said telephone set is connected to said line and said switch hook is subsequently switched to a second position for transmitting over said line to said second data set a line control signal indicative to said second data set that it is desired to disconnect said telephone set from said line and for disconnecting said telephone set from said line no sooner than at a time subsequent to the transmission of said line control signal.

4. A data set adapted for use in conjunction with a telephone set, said data set comprising data communication means for transmitting voiceband data signals to, and receiving voiceband data signals from, a second data set over a voiceband telephone line, means operative when the switch hook of said telephone set is in a first position for connecting a selected one of said data communication means and said telephone set to said line, and line control means operative when said telephone set is connected to said line and said switch hook is subsequently switched to a second position for transmitting over said line to said second data set a first line control signal indicative to said second data set that it is desired to disconnected said telephone set from said line and for thereafter disconnecting said telephone set from said line in response to a second line control signal subsequently received from said second data set over said line, said second line control signal being indicative to said first data set that said first line control signal was received by said second data set.

5. A data set adapted for use in conjunction with a telephone set and a data source, said data set comprising
  data communication means for transmitting to a second data set over a voiceband telephone line voiceband data signals respresenting data provided by said data source and for receiving voiceband data signals from said second data set over said line, said data communication means and said telephone set being selectively connectable to said line,
  means for receiving from said source a control signal having first and second values, said first value indicating that said data communication means can be connected to said line and said second value indicating that it should not be connected to said line, and
  line control means operative in response to the switching of said control signal from said first value to said second value and operative when said data communication means is connected to said line for transmitting over said line to said second data set a line control signal indicative of said switching and for disconnecting said data communication means from said line no sooner than at a time subsequent to the transmission of said line control signal.

6. A data set adapted for use in conjunction with a telephone set and a data source, said data set comprising
  data communication means for transmitting to a second data set over a voiceband telephone line voiceband data signals representing data provided by said data source and for receiving voiceband data signals from said second data set over said line, said data communication means and said telephone set being selectively connectable to said line,
  means for receiving from said source a control signal having first and second values, said first value indicating that said data communication means can be connected to said line and said second value indicating that it should not be connected to said line, and
  line control means operative in response to the switching of said control signal from said first value to said second value and operative when said data communication means is connected to said line for transmitting over said line to said second data set a first line control signal indicative of said switching and for disconnecting said data communication means from said line in response to a second line control signal subsequently received from said second data set over said line, said second line control signal being indicative to said first data set that said first line control signal was received by said second data set.

7. The invention of claims 1, 3 or 5 wherein said data communication means is adapted to transmit and receive said voiceband data signals over said line via a first data communication channel and wherein said line control means is adapted to transmit said line control signal over said line via a second data communication channel.

8. The invention of claim 7 wherein said first and second channels comprise respective portions of the frequency spectrum of said line.

9. The invention of claims 2, 4 or 6 wherein said data communication means is adapted to transmit and receive said voiceband data signals over said line via a first data communication channel and wherein said line control means is adapated to transmit said first and second line control signals over said line via a second data communication channel.

10. The invention of claim 9 wherein said first and second channels comprise respective portions of the frequency spectrum of said line.

11. A method for use in a data set adapted for use in conjunction with a telephone set which has a talk button and a data button, said data set comprising data communication means for transmitting voiceband data signals to, and receiving voiceband data signals from, a second data set over a voiceband telephone line, and means operative when said talk button is operated for connecting said telephone set to said line and for thereafter connecting said data communication means to said line in response to operation of said data button, said method comprising the steps of
  transmitting to said second data set over said line, when said data communication means is connected to said line and said talk button is thereafter operated, a line control signal indicative of the operation of said talk button, and
  reconnecting said telephone set to said line no sooner than at a time subsequent to the transmission of said line control signal.

12. A method for use in a data set adapted for use in conjunction with a telephone set which has a talk button and a data button, said data set comprising data communication means for transmitting voiceband data signals to, and receiving voiceband data signals from, a second data set over a voiceband telephone line, and means operative when said talk button is operated for connecting said telephone set to said line and for thereafter connecting said data communication means to said line in response to operation of said data button, said method comprising the steps of
  transmitting to said second data set over said line, when said data communication means is connected to said line and said talk button is thereafter operated, a first line control signal indicative of the operation of said talk button, and
  reconnecting said telephone set to said line no sooner than at a time subsequent to receipt from said second data set over said line of a second line control signal indicative to said data set that said first line control signal was received by said second data set.

13. A method for use in a data set adapted for use in conjunction with a telephone set, said data set comprising data communication means for transmitting voiceband data signals to, and receiving voiceband data signals from, a second data set over a voiceband telephone line, and means operative when the switch hook of said telephone set is in a first position for connecting a selected one of said data communication means and said telephone set to said line, said method comprising the steps of transmitting over said line to said second data set when said telephone set is connected to said line and said switch hook is subsequently switched to a second position a line control signal indicative to said second data set that it is desired to disconnect said telephone set from said line, and disconnecting said telephone set from said line no sooner than at a time subsequent to the transmission of said line control signal.

14. A method for use in a data set adapted for use in conjunction with a telephone set, said data set comprising data communication means for transmitting voiceband data signals to, and receiving voiceband data signals from, a second data set over a voiceband telephone line, and means operative when the switch hook of said telephone set is in a first position for connecting a selected one of said data communication means and said telephone set to said line, said method comprising the steps of transmitting over said line to said second data set when said telephone set is connected to said line and said switch hook is subsequently switched to a second position a first line control signal indicative to said second data set that it is desired to disconnect said telephone set from said line, and thereafter disconnecting said telephone set from said line in response to a second line control signal subsequently received from said second data set over said line, said second line control signal being indicative to said first data set that said first line control signal was received by said second data set.

15. A method for use in a data set adapted for use in conjunction with a telephone set and a data source, said data set comprising data communication means for transmitting to a second data set over a voiceband telephone line voiceband data signals representing data provided by said data source and for receiving voiceband data signals from said second data set over said line, said data communication means and said telephone set being selectively connectable to said line, and means for receiving from said source a control signal having first and second values, said first value indicating that said data communication means can be connected to said line and said second value indicating that it should not be connected to said line, said method comprising the steps of transmitting over said line to said second data set in response to the switching of said control signal from said first value to said second value and when said data communication means is connected to said line a line control signal indicative of said switching, and disconnecting said data communication means from said line no sooner than at a time subsequent to the transmission of said line control signal.

16. A method for use in a data set adapted for use in conjunction with a telephone set and a data source, said data set comprising data communication means for transmitting to a second data set over a voiceband telephone line voiceband data signals representing data provided by said data source and for receiving voiceband data signals from said second data set over said line, said data communication means and said telephone set being selectively connectable to said line, and means for receiving from said source a control signal having first and second values, said first value indicating that said data communication means can be connected to said line and said second value indicating that it should not be connected to said line, said method comprising the steps of transmitting over said line to said second data set in response to the switching of said control signal from said first value to said second value and when said data communication means is connected to said line a first line control signal indicative of said switching, and disconnecting said data communication means from said line in response to a second line control signal subsequently received from said second data set over said line, said second line control signal being indicative to said first data set that said first line control signal was received by said second data set.

* * * * *